(12) United States Patent
Ye et al.

(10) Patent No.: US 12,148,174 B2
(45) Date of Patent: Nov. 19, 2024

(54) METHOD FOR FORECASTING MOTION TRAJECTORY, STORAGE MEDIUM, AND COMPUTER DEVICE

(71) Applicant: SHENZHEN DEEPROUTE.AI CO., LTD, Shenzhen (CN)

(72) Inventors: Maosheng Ye, Shenzhen (CN); Tongyi Cao, Shenzhen (CN)

(73) Assignee: SHENZHEN DEEPROUTE.AI CO., LTD, Shenzhen (CN)

( * ) Notice: Subject to any disclaimer, the term of this patent is extended or adjusted under 35 U.S.C. 154(b) by 498 days.

(21) Appl. No.: 17/530,465

(22) Filed: Nov. 19, 2021

(65) Prior Publication Data

US 2023/0162374 A1 May 25, 2023

(51) Int. Cl.
*G06T 7/246* (2017.01)
*G05D 1/00* (2006.01)

(52) U.S. Cl.
CPC .......... *G06T 7/246* (2017.01); *G05D 1/0253* (2013.01); *G06T 2207/10028* (2013.01); *G06T 2207/20081* (2013.01); *G06T 2207/20084* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 10,858,012 B2* | 12/2020 | Maura | B62D 15/025 |
| 11,345,040 B2* | 5/2022 | Oleynik | G05B 19/4183 |
| 11,465,619 B2* | 10/2022 | Silva | B60W 30/09 |
| 11,719,821 B2* | 8/2023 | Pazhayampallil | B60W 40/105 |
| | | | 701/26 |
| 11,897,462 B2* | 2/2024 | Saiki | B60W 50/14 |
| 11,932,282 B2* | 3/2024 | Caldwell | B60W 60/0011 |
| 2021/0200230 A1* | 7/2021 | Ross | G05D 1/0088 |
| 2022/0011122 A1* | 1/2022 | He | G06N 3/044 |
| 2022/0139222 A1* | 5/2022 | Bao | G08G 1/0116 |
| | | | 701/24 |
| 2023/0041975 A1* | 2/2023 | Caldwell | G05B 13/0265 |
| 2023/0333252 A1* | 10/2023 | Pazhayampallil | B60W 30/146 |

\* cited by examiner

*Primary Examiner* — Anand P Bhatnagar
(74) *Attorney, Agent, or Firm* — Kilpatrick Townsend & Stockton LLP

(57) ABSTRACT

The present disclosure relates to a method for forecasting a motion trajectory, a computer-readable storage medium, and a computer device. The method includes: obtaining an observed past trajectory of an object; obtaining a spatial pointwise feature of each trajectory point in the observed past trajectory; obtaining a temporal pointwise feature of the trajectory point according to the spatial pointwise feature of the trajectory points within a preset observation time interval; and performing motion trajectory prediction on the object according to the spatial pointwise feature and the temporal pointwise feature of the trajectory points. The present disclosure promotes the accuracy of the motion trajectory prediction.

14 Claims, 4 Drawing Sheets

METHOD FOR FORECASTING MOTION TRAJECTORY, STORAGE MEDIUM, AND COMPUTER DEVICE

FIELD

The present disclosure relates to a field of autonomous driving technology, and particularly to a method for forecasting a motion trajectory, a computer-readable storage medium, and a computer device.

BACKGROUND

Motion forecasting in autonomous driving concerns future trajectories of objects, including vehicles and pedestrians. For a self-driving car, the predicted future trajectories of surrounding traffic participants serve as key information to plan its future trajectories. A self-driving car should be able to predict the distribution or a few possible future trajectories of each object as the future is full of uncertainty, given the relevant sensor input information in the past.

Traditional methods for forecasting a motion trajectory are mainly based on kinematic constraints and high-precision map information. These methods encode the objects and high-definition map information by rasterizing the corresponding elements (e.g., lanes, crosswalks) into lines and polygons with different colors. A standard image backbone network is then applied to the rasterized image to extract the feature of the map and object and perform prediction.

Although many improvements have been made to traditional methods for forecasting motion trajectory, these improvements have not made full use of the implicit information that can reflect the motion trend of the object, resulting in low accuracy of motion trajectory prediction.

SUMMARY

Various exemplary embodiments in the present disclosure provide a method for forecasting a motion trajectory, a computer-readable storage medium, and a computer device.

In an aspect of the present disclosure, a method for forecasting a motion trajectory is provided, including:
- an observed past trajectory of an object is obtained;
- a spatial pointwise feature of each trajectory point in the observed past trajectory is obtained;
- a temporal pointwise feature of the trajectory point is obtained according to the spatial pointwise feature of the trajectory points within a preset observation time interval;
- a motion trajectory prediction on the object is performed according to the spatial pointwise feature and the temporal pointwise feature of the trajectory points.

In another aspect of the present disclosure, a computer-readable storage is provided, which stores a computer program; the computer program is executed by a processor to implement the aforementioned method for forecasting the motion trajectory.

In another aspect of the present disclosure, a computer device is provided, including a processor and a memory storing a computer program, the processor, when executing the computer program, implements the aforementioned method for forecasting the motion trajectory.

DETAILED DESCRIPTION

It should be understood that the specific embodiments described herein are only used for explaining the present disclosure, rather than limiting the present disclosure.

Figure 1:
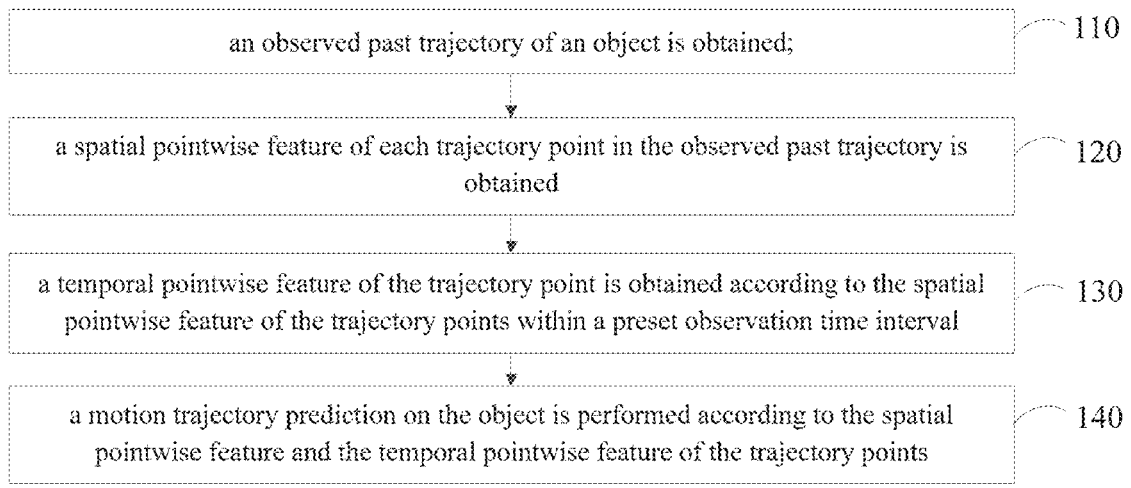
FIG. 1 is a flowchart of a method for forecasting a motion trajectory according to an embodiment.

In an embodiment, as shown in FIG. 1, a method for forecasting a motion trajectory includes the following steps:
- step 110, an observed past trajectory of an object is obtained;
- step 120, a spatial pointwise feature of each trajectory point in the observed past trajectory is obtained;
- step 130, a temporal pointwise feature of the trajectory point is obtained according to the spatial pointwise feature of the trajectory points within a preset observation time interval; and
- step 140, a motion trajectory prediction on the object is performed according to the spatial pointwise feature and the temporal pointwise feature of the trajectory points.

The method for forecasting a motion trajectory of the present disclosure can be implemented by a network called TPCN (Temporal Point Cloud Networks). TPCN includes a dual-representation spatial learning device and a dynamic temporal learning device. The dual-representation space learning device is configured to extract spatial pointwise features, and the dynamic temporal learning device is configured to extract temporal pointwise features.

In one embodiment, the observed past trajectory of the object can be first obtained, and feature extraction and learning can be performed on trajectory points in the observed past trajectory, which is represented in coordinates, through the dual-representation spatial learning device to output the spatial pointwise feature of the trajectory points. There are many specific implementation manners for outputting the spatial pointwise feature based on the observed past trajectory. In some embodiments, different design specific implementation manner according to actual needs.

The temporal feature can be further learned based on the spatial pointwise features output by the dual-representation spatial learning device through the dynamic temporal learning device to output the temporal pointwise features of the trajectory points. First, different observation time intervals can be preset, and the observation time interval to which the trajectory point belongs is determined according to its observation time. Then the temporal pointwise feature can be learned according to the spatial pointwise feature of the trajectory points in the observation time interval, and the temporal pointwise features output based on different observation time intervals are fused to obtain the final temporal pointwise feature of each trajectory point.

The motion trajectory prediction is performed based on the dual-representation of the spatial pointwise feature and the temporal pointwise feature of each trajectory point, and the time information is integrated in the motion trajectory prediction, and the accuracy of the motion trajectory prediction is promoted.

The dual-representation spatial learning device and the dynamic temporal learning device are integrated to propagate features mutually in spatial and temporal dimensions to achieve joint learning. Through the mutual propagation of the spatial and temporal features of these two devices, spatial learning can use time information (e.g., motion status) for spatial feature learning, and temporal learning can also use spatial information (e.g., map information) for temporal feature learning.

Figure 2:
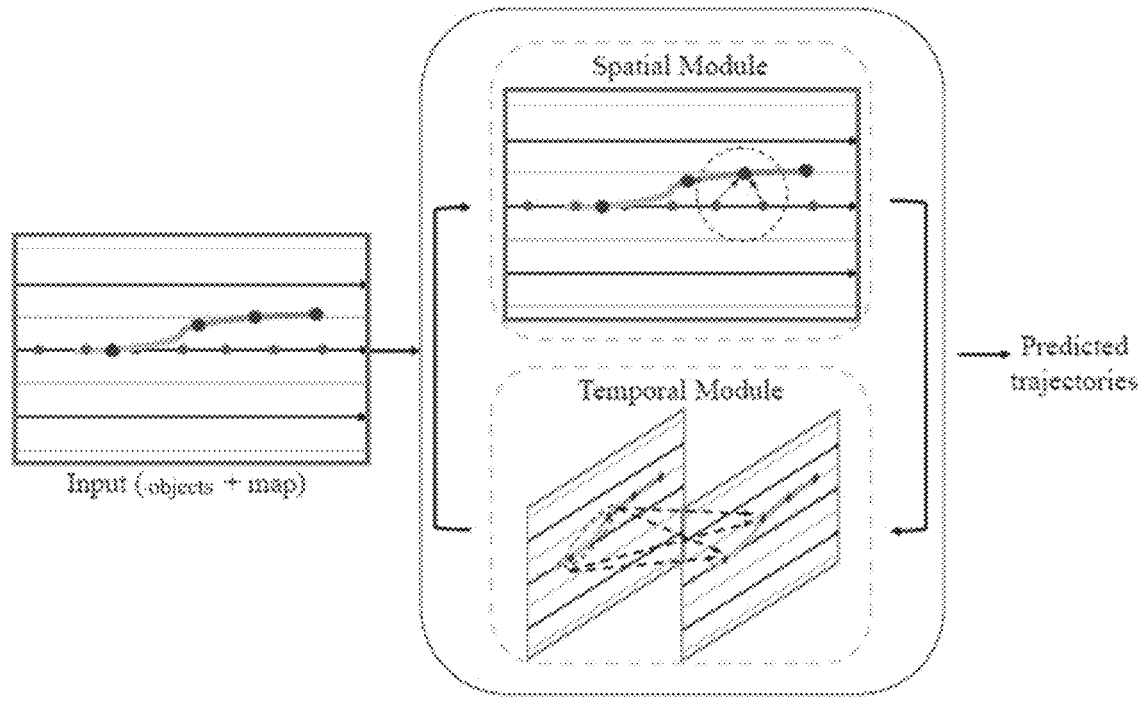
FIG. 2 is a schematic diagram of the TPCN-based method for forecasting motion trajectory.

FIG. 2 shows a schematic diagram of the TPCN-based method for forecasting motion trajectory. As shown in FIG. 2, each device takes the pointwise features of the other device as input to generate corresponding pointwise output features, which is a natural foundation for fusing pointwise context information across multiple domains. Compared with GCN (Graph Convolution Network) based methods, the method for forecasting motion trajectory according to the present disclosure does not manually specify the interaction structures (e.g., connectivity in the graph) and avoid the complex correlation learning process. The motion trajectory prediction task can be realized as a joint learning between the space device and the time device through the TPCN.

In an embodiment, the step 120 includes the followings steps:

a first spatial pointwise feature of each trajectory point is obtained by performing feature extraction on each trajectory point; the first spatial pointwise feature of each trajectory point is transformed into a second spatial pointwise feature by point-voxel propagation; a spatial pointwise feature of the trajectory point is obtained by fusing the first spatial pointwise feature with the second spatial pointwise feature.

In one embodiment, the feature extraction can be performed on each trajectory point through a full connection layer to obtain the first spatial pointwise feature of each trajectory point. The geometric information and neighborhood relationship for interactions among points can be maintained in the first spatial pointwise feature. The object instance can be defined as an object with a set of trajectory points. Thus, the object can be represented by $\{p_{i,1}, p_{i,2}, \ldots, p_{i,Ti}\}$, where $p_{i,t}$ means the i-th object's coordinate at time t, and Ti is the time sequence length for i-th object.

The point-voxel propagation includes the feature propagation from point to voxel and the feature propagation from voxel to point. In one embodiment, the first spatial pointwise feature is first propagated to a voxel, and then the feature of the voxel is propagated to the point to form the second spatial pointwise feature for the trajectory points.

The final spatial pointwise feature of the trajectory points is obtained by fusing the first spatial pointwise feature with the second spatial pointwise feature.

The above method for forecasting motion trajectory converts the first spatial pointwise feature of each trajectory point into the second spatial pointwise feature through the point-voxel propagation, and then the fusion between the first spatial pointwise feature and the second spatial pointwise feature is performed to obtain spatial pointwise features, and the information contained in the dual-representation of points and voxels is fully used and the accuracy of motion trajectory prediction is improved.

In an embodiment, the step of transforming the first spatial pointwise feature of each trajectory point into a second spatial pointwise feature by point-voxel propagation further includes:

a spatial voxelwise feature of a voxel is obtained by propagating the first spatial pointwise feature of the trajectory points to a corresponding voxel; the second spatial pointwise feature of the trajectory points is obtained by propagating the spatial voxelwise feature of the voxel to a corresponding trajectory points.

The voxel is obtained by gridding an interested area. Given a grid size s, a mapping from trajectory point $p_i=(x_i, y_i)$ to its corresponding voxel can be formulated by the following manner:

$$v_s=(\lfloor x_i/s \rfloor, \lfloor y_i/s \rfloor);$$

where $\lfloor \cdot \rfloor$ is a floor function. Thus a hash table for the conversion between point coordinate space and voxel coordinate space $\{pi, vi\}$ is formulated.

In an embodiment, the step of obtaining the spatial voxelwise feature of the voxel by propagating the first spatial pointwise feature of the trajectory points to the corresponding voxel further includes:

a first target voxel to which the trajectory points belongs is determined; a target trajectory point belonging to the first target voxel is determined, and a pooling operation is performed on the first spatial pointwise feature of each target trajectory point to obtain the spatial voxelwise feature of the first target voxel.

In one embodiment, the feature of the trajectory points can be propagated to its corresponding voxel through the scattering operation. First, a key-value pairs of the formulated hash table is used to map the Cartesian coordinates of the trajectory points to a voxel index. Then a spatial voxelwise feature of the voxel can be obtained by FTP (Feature Transformation Propagation algorithm) algorithm, which determines the first target voxel based on the mapping relationship between the trajectory points and the voxel. Then the target trajectory points belonging to the same first target voxel is determined and the pooling operation will be performed on the first spatial pointwise feature of each target trajectory points, for example, a mean value of the first spatial pointwise feature of each target trajectory points can be calculated. The feature output from the pooling operation can be used as the spatial voxelwise feature of the first target voxel.

In an embodiment, the step of obtaining the second spatial pointwise feature of the trajectory points by propagating the spatial voxelwise feature of the voxel to a corresponding trajectory points further includes:

the spatial voxelwise feature of the first target voxel is assigned to the trajectory points by interpolation to obtain the second spatial pointwise feature.

In order to fuse the features represented with different manner, the feature of the voxel space will be transformed to the feature of the point space. In one embodiment, feature propagation from voxel to point can be performed by the naive nearest neighbor interpolation.

In an embodiment, the step of obtaining the spatial pointwise features of the trajectory point by fusing the first spatial pointwise feature and the second spatial pointwise feature further includes:

the first spatial pointwise feature and the second spatial pointwise feature of the trajectory points are concatenated to obtain the spatial pointwise feature.

In one embodiment, the feature concatenation can be performed on the first spatial pointwise feature and the second spatial pointwise feature of the trajectory points, and the spatial pointwise feature of each trajectory point can be obtained. Thus, we obtain the features with dual representations and higher context information, which will be passed to the next stage of dynamic temporal learning.

In other embodiments, the fusion of the first spatial pointwise feature and the second spatial pointwise feature can be performed in other manners. For example, the full connection can be performed to fuse the first spatial pointwise feature with the second spatial pointwise feature.

In the dual representation space learning device, it is considered that the trajectory points of the objects and map points have similar properties as point clouds, both being sparse and permutation invariant, and have strong geometry correlation. Thus point cloud learning strategies can be effective for spatial feature extractions. In view of the above characteristics, the present disclosure proposes the method of dual-representations space learning to realize the extraction of the spatial feature, and the point-level and space-level feature are obtained through the point cloud learning to reduce the computational cost.

Figure 3:
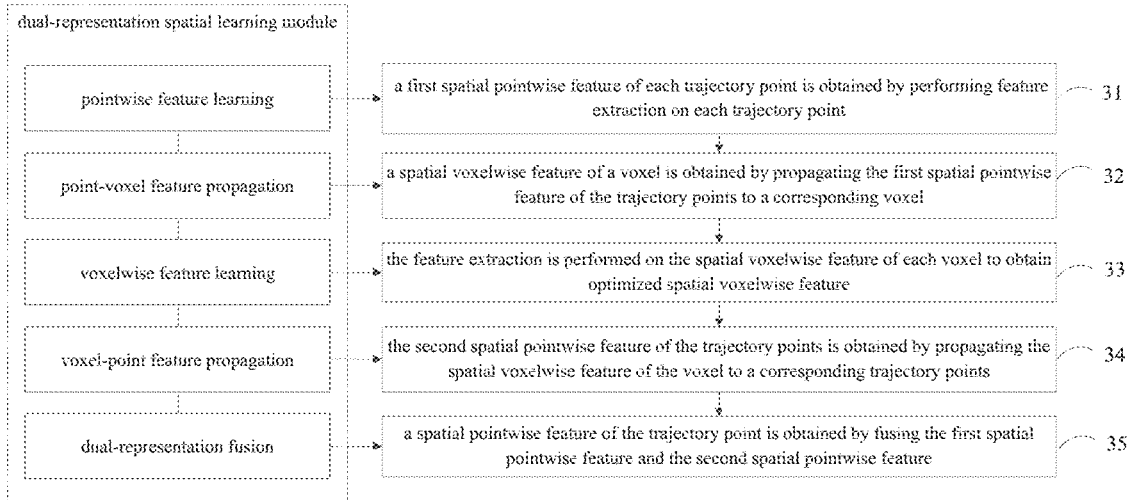
FIG. 3 is a schematic diagram of the dual-representation spatial learning according to an embodiment.

The extraction of the spatial pointwise feature can be implemented by the dual-representation spatial learning device of TPCN. FIG. 3 shows a schematic diagram of the dual-representation spatial learning according to an embodiment. The dual-representation spatial learning of TPCN further includes a pointwise feature learning component, a point-voxel feature propagation component, a voxelwise feature learning component, a voxel-point feature propagation component, and a dual-representation fusion component, which are configured to implemented the following steps respectively:

step 31, a first spatial pointwise feature of each trajectory point is obtained by performing feature extraction on each trajectory point;

step 32, a spatial voxelwise feature of a voxel is obtained by propagating the first spatial pointwise feature of the trajectory points to a corresponding voxel;

step 33, the feature extraction is performed on the spatial voxelwise feature of each voxel to obtain optimized spatial voxelwise feature;

step 34, the second spatial pointwise feature of the trajectory points is obtained by propagating the spatial voxelwise feature of the voxel to a corresponding trajectory points;

step 35, a spatial pointwise feature of the trajectory point is obtained by fusing the first spatial pointwise feature and the second spatial pointwise feature.

In one embodiment, the pointwise feature learning component is configured to perform feature extraction on each trajectory points through a full connection layer to obtain the first spatial pointwise feature of each trajectory point. In practical use, PointNet++ (a feature extraction network) can be used to perform feature extraction at different levels in the local domain to take advantage of more local structures and correlations.

The point-voxel feature propagation component is configured to propagate the first spatial pointwise feature of the trajectory points to the corresponding voxels to obtain the spatial voxel feature of the voxels.

The voxelwise feature learning component is configured to perform feature extraction on the spatial voxel features of the voxel through a sparse convolutional network. Sparse convolution can be used as a feature extractor, which affords a smaller grid size for fine-grained voxelwise features. Further, a sparse bottleneck network with skip connections, which replaces the bottleneck blocks with sparse convolutions in ResNet can be constructed. Stacking Sparse BottleNeck layers not only quickly expands the receptive field at a low computational cost but also keeps the activation sparse. It should be noted that the voxelwise feature learning component is according to some embodiments. The features output by the point-to-voxel feature propagation component can be further performed the feature extraction through the voxel feature learning component to obtain the spatial voxelwise features; or directly used as spatial voxel feature of voxels.

The voxel-point feature propagation component is configured to obtain the second spatial pointwise feature of the trajectory points by propagating the spatial voxelwise feature of the voxels to the corresponding trajectory points.

The dual-representation fusion component is configured to obtain the spatial pointwise feature of the trajectory points by fusing the first spatial pointwise feature with the second spatial pointwise feature.

Figure 4:
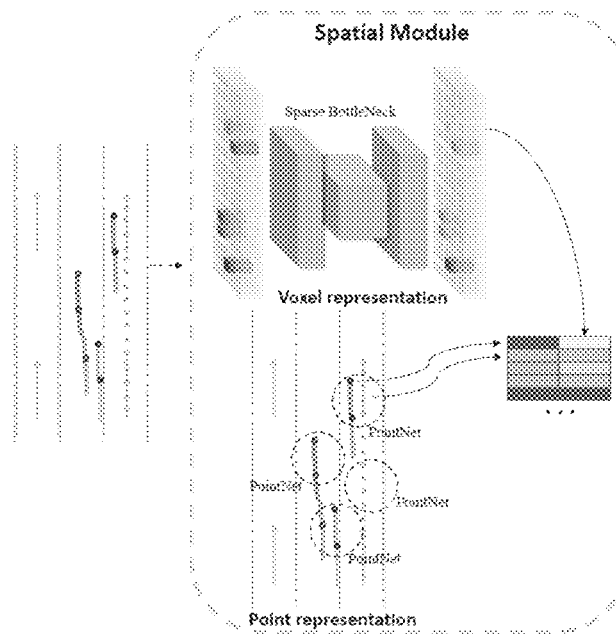
FIG. 4 is an architecture diagram of a dual-representation spatial learning device of TPCN according to an embodiment.

FIG. 4 is an architecture diagram of a dual-representation spatial learning device of TPCN according to an embodiment. As shown in the figure, the above dual-representation spatial learning device can use point cloud learning and use locality and spatial geometry to retrieve the spatial feature of trajectory points and map data. At the same time, the fusion of dual-representation can make full use of the complementary information of voxels and points representation, which has advantages compared with the prediction method that use only a single representation in the prior art.

In an embodiment, the step 130 further includes:
the observation time intervals is determined according to a preset time interval; an output feature of each trajectory point is determined according to the spatial pointwise feature of each trajectory point, and the temporal pointwise features of each trajectory point is obtained according to the output feature of the trajectory points corresponding to each observation time interval.

In one embodiment, a time interval can be preset, and multiple observation time intervals can be divided according to the time interval. For example, the time interval can be set to 2, 4, 8, 16 time units respectively, and the multiple observation time intervals are respectively [0, 2], [0, 4], [0, 8], and [0, 16]. In some embodiments, the observation time interval can be divided in different manners according to actual needs.

The spatial pointwise feature of each trajectory point can be used as an initial output feature. In some embodiments, other manners to determine the output features may be used according to the spatial pointwise features of the trajectory points. For example, the features obtained after feature extraction of the spatial pointwise features of the trajectory points are used as the output features.

Figure 5:
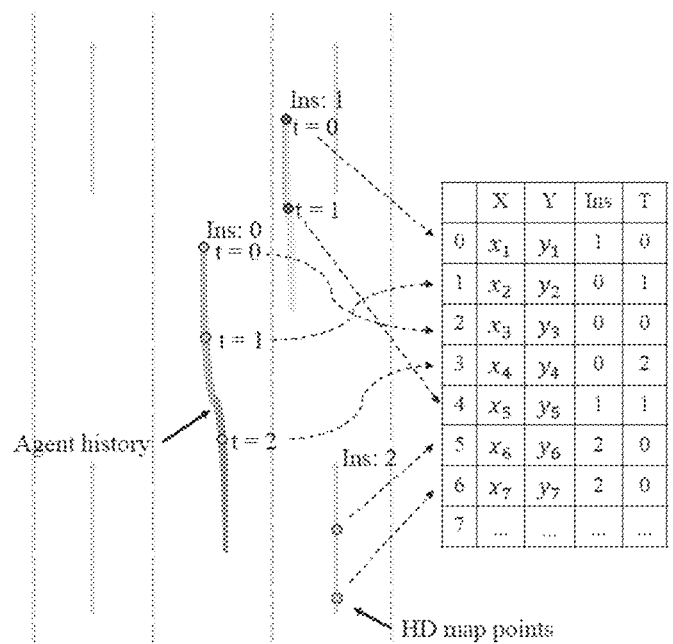
FIG. 5 is a schematic diagram of a temporal space indexing system according to an embodiment.

Each observation time interval has corresponding trajectory points. In one embodiment, a temporal space indexing system can be formulated to address the dynamics and different sequential lengths of the observed past trajectories of different objects. All the objects instances (i.e., the observed past trajectories) can be represented over time as $\{m_i\}$, where the i-th element $m_i=(ins_i, t_i)$ is an instance time index referring to the $t_i$-th trajectory point of instance $ins_i$. For example, as shown in FIG. 5, it can be determined that the coordinates of $ins_1$ at the 0-th second are $(x_1, y_1)$ according to the observed past trajectory of a prediction object instance $ins_1$, and the time index $m_0=(ins_1, 0)$ can be determined. Thus, a trajectory point corresponding to an observation time interval can be determined according to the temporal space indexing system.

The temporal pointwise feature of each trajectory point can be further obtained according to the output feature of the trajectory points corresponding to different observation time intervals.

It should be noted that different objects have different lifespans in the motion trajectory prediction task, and the time lengths of observed past trajectories are also different. The object data whose time length is smaller than a preset length will be padded with zero to process data with the same time length. However, padding data can introduce extra unnecessary computation cost, especially when the objects only appear in very few shots. Further, the padded data can cause the feature confusion problem. The method for forecasting motion trajectory of the present disclosure can preserve the originally provided information without requirement for a fixed time buffer size for each object data. Therefore, the object data with dynamic time sequence length can be retained for each object, and the extra unnecessary computation cost and he feature confusion problem can be avoided.

In an embodiment, the step of obtaining the temporal pointwise features of each trajectory point according to the output feature of the trajectory points corresponding to each observation time interval further includes:

a present observation time interval is determined from the observation time intervals; a first temporal pointwise feature of an interval trajectory point is determined according to the output features for each trajectory point; the interval trajectory point is the trajectory point whose observation time within the present observation time interval; the temporal pointwise feature of each trajectory point is obtained according to the first temporal pointwise feature of the interval trajectory point; the temporal pointwise feature of each trajectory point is assigned to the output feature, and returns to the step of determining present observation time interval from the observation time intervals to determine the next observation time interval and iteratively update the temporal pointwise feature of each trajectory point until the present observation time interval reaches a preset maximum observation time interval.

In an embodiment, a start time of the next observation time interval and the present observation time interval are the same, and the difference of an end time between the next observation time interval and the present observation time interval is the preset time interval. For example, the present observation time interval is [0,2], and the next observation time interval is [0,4].

In one embodiment, the present observation time interval can be determined in preset observation time intervals first to obtain the temporal pointwise feature of the trajectory points for each trajectory point in the present observation time interval. The trajectory points with the observation time within the present observation time interval can be determined as the interval trajectory points according to the temporal space indexing system. In one embodiment, the trajectory points whose observation time point are within the current observation time interval and belong to the same object instance can be determined as the interval trajectory points.

The first temporal pointwise feature of the interval trajectory points can be determined according to the output feature of each trajectory point and the interval trajectory point. For example, a full connection can be performed on the output features for each trajectory point to obtain the second temporal pointwise feature of each trajectory point. The first temporal pointwise feature of the interval trajectory point can be further obtained by learning the second temporal pointwise feature of the interval trajectory point.

A final temporal pointwise feature of each trajectory point can be further obtained according to a fusion between the first temporal pointwise feature of the interval trajectory points and the second temporal pointwise feature of each trajectory point. For example, the fusion can be implemented by concatenating the first temporal pointwise feature of the interval trajectory points and the second temporal pointwise feature of each trajectory point.

The newly obtained temporal pointwise features of each trajectory point can be assigned to the output features again, and a next observation time interval can be determined for the next iterative update of the temporal pointwise feature for each trajectory point.

The temporal pointwise feature learning process can be repeated based on the updated output features and the observation time interval until the present observation time interval reaches the preset maximum observation time interval, and the present temporal pointwise feature of each trajectory points can be used as the final temporal pointwise feature.

The above method for forecasting motion trajectory uses the gradual increase of the observation time interval to expand the perception field of vision, and the temporal pointwise feature is iteratively updated based on the gradually increasing observation time interval, and the temporal pointwise feature of each trajectory point can represent more temporal information to improve the accuracy of motion trajectory prediction.

In an embodiment, the step of determining the first temporal pointwise feature of the interval trajectory point according to the output features for each trajectory point further includes:

a full connection on the output features is performed for each trajectory point to obtain a second temporal pointwise feature of each trajectory point; the second temporal pointwise feature of each interval trajectory point is transformed to the first temporal pointwise feature through the point-voxel propagation.

In one embodiment, a full connection can be performed on the output features for each trajectory point through MLP (Multilayer Perceptron) to obtain the second temporal pointwise feature for each trajectory point. Then the second temporal pointwise feature of each interval trajectory point is transformed to the first temporal pointwise feature through the point-voxel propagation. Therefore the representation of the temporal pointwise feature can be promoted, which improves the accuracy of motion trajectory prediction.

In an embodiment, the step of transforming the second temporal pointwise feature of each interval trajectory point to the first temporal pointwise feature through the point-voxel propagation further includes:

a second target voxel to which the interval trajectory points belongs is determined; a target interval trajectory point belonging to the second target voxel is determined, and a pooling operation is performed on the second temporal pointwise feature of each target interval trajectory point to obtain a temporal voxelwise feature of the second target voxel; the temporal voxelwise feature of the second target voxel is assigned to the target interval trajectory points to obtain the first temporal pointwise feature of the target interval trajectory points.

Since the process of the point-voxel propagation has been described in detail in the above embodiments, it will not be repeated here.

In an embodiment, the step of obtaining the temporal pointwise feature of each trajectory point according to the first temporal pointwise feature of the interval trajectory point further includes:

the second temporal pointwise feature of each trajectory points and the first temporal pointwise feature of each interval trajectory point are fused to obtain the temporal pointwise feature of each trajectory point.

By fusing the second temporal pointwise feature of each trajectory point with the first temporal pointwise feature of each interval trajectory point, the temporal pointwise feature of each trajectory point is obtained, and the time-varying information can be represented with the temporal pointwise feature, which improves the accuracy of motion trajectory prediction.

Figure 6:
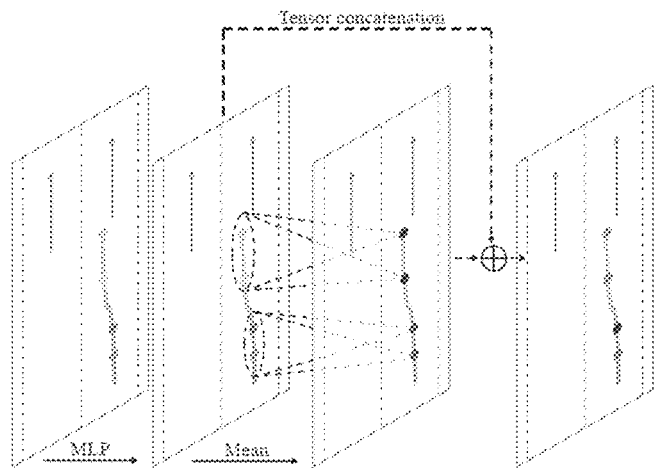
FIG. 6 shows a flow diagram of the temporal pointwise feature acquisition based on the output feature according to an embodiment.

FIG. 6 shows a flow diagram of the temporal pointwise feature acquisition based on the output feature according to an embodiment. As shown in the figure, a full connection is first performed on the output feature of the trajectory points through MLP to output the second temporal pointwise feature. Then the second temporal pointwise feature of the interval trajectory point determined by each observation time interval is processed by pooling operation to obtain the first temporal pointwise feature of the interval trajectory point. The second temporal pointwise feature of the trajectory point is concatenated with the first temporal pointwise feature of the interval trajectory point through the tensor concatenation to obtain the temporal pointwise feature of all trajectory points.

In an embodiment, the method further includes the following step before determining the first temporal pointwise feature of an interval trajectory point according to the output features for each trajectory point when the observation time of the object beyond the maximum observation time interval:

a pooling operation is performed on the output feature to obtain pooled output feature;

the step of determining the first temporal pointwise feature of the interval trajectory point according to the output features for each trajectory point further includes:

a full connection is performed on the pooled output features for each trajectory point to obtain a third temporal pointwise feature of each trajectory point; a pooling operation is performed on the third temporal pointwise feature of the interval trajectory point to obtain the first temporal pointwise feature of the interval trajectory points.

It should be noted that there are objects whose observation time exceeds the maximum observation time interval. For example, when the start point and end point of a lane centerline are far away from each other, the observation time will exceed the maximum observation time interval, which is hard to design a suitable method to handle the dependency or correlation between the trajectory points of the lane centerline. Therefore, the present disclosure proposes an instance pooling method for some embodiments, which provides a more flexible way for the feature extraction.

In one embodiment, compared with the multi-interval learning, a pooling operation can be first performed on the output feature in the instance pooling method to obtain a pooled output features. Then a full connection is performed on the pooled output features to obtain the third temporal pointwise feature. The third temporal pointwise feature can be pooled to obtain the first temporal pointwise feature for the interval trajectory points. Since the observation time of the object exceeds the maximum observation time interval, there is no inverse assignment performed compared with multi-time scale learning.

The above instance pooling method for forecasting motion trajectory of the present disclosure is applicable for the objects whose observation time exceeds the maximum observation time interval, which promotes the applicability of the motion trajectory prediction.

In order to implement the above multi-interval learning and instance pooling, the dynamic temporal learning device of TPCN can be designed to include a multi-interval learning component and an instance pooling component. The multi-interval learning component is configured to obtain temporal pointwise features based on the spatial pointwise features, and the instance pooling component is configured to obtain the temporal pointwise feature for the objects whose observation time exceeds the maximum observation time interval.

It should be noted that the present disclosure extends the ideas from 3-Dimensional point cloud learning to the motion forecasting task. The metric space is extent to a joint spatial-temporal space, and the observed past motion trajectory of the objects and map data are represented as points in this space. Since the raw input data of prediction is a set of points that contain different objects with historical observations and map data, spatial and temporal learning will be two key components in prediction learning. Ignoring either information will lead to information loss and reduce the model's capability of context learning. In order to combine spatial and temporal learning in a flexible and unified framework, the above method for forecasting motion trajectory is disclosed in the present disclosure, which includes the following aspects:

1. A spatial learning method for extracting effective feature of spatial information (including road sign and map data) is disclosed in the embodiments herein. In the spatial learning, the spatial feature of the discrete points is retrieved with the point cloud method, and the locality and spatial geometry is used to map the data;
2. A temporal learning method for extracting effective feature of the temporal feature of the time series information of the motion trajectory is disclosed in the embodiments herein. In order to handle with the trajectories with different time lengths, a dynamic temporal learning method is proposed to achieve better temporal information propagation;
3. A joint learning method of temporal domain and spatial domain is disclosed. The spatial learning device and the temporal learning device are integrated to propagate features mutually in spatial and temporal dimensions to improve the information contained in the output feature.

Figure 7:
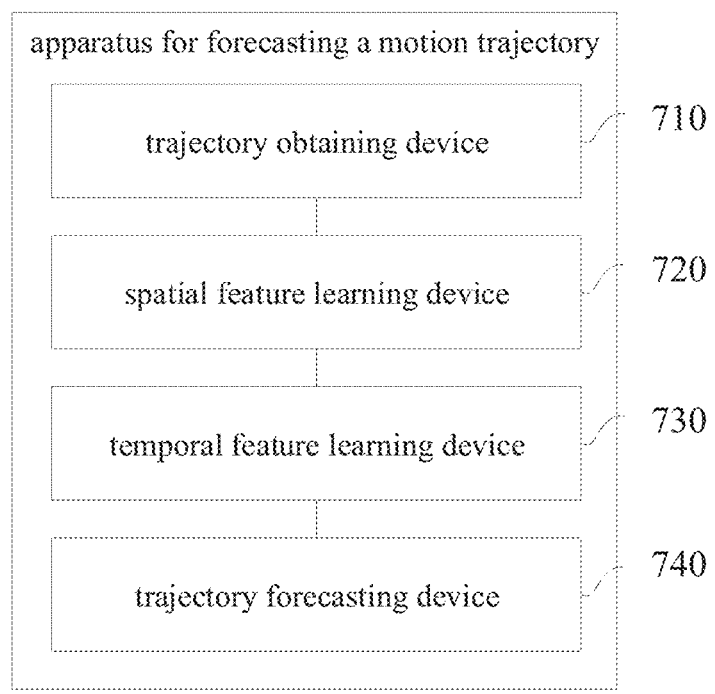
FIG. 7 is a block diagram of a structure of an apparatus for forecasting a motion trajectory according to an embodiment.

In an embodiment, as shown in FIG. 7, an apparatus for forecasting a motion trajectory includes:

a trajectory obtaining device 710, configured to obtain an observed past trajectory of an object;

a spatial feature learning device 720, configured to obtain a spatial pointwise feature of each trajectory point in the observed past trajectory;

a temporal feature learning device 730, configured to obtain a temporal pointwise feature of the trajectory point according to the spatial pointwise feature of the trajectory points within a preset observation time interval;

a trajectory forecasting device 740, configured to perform motion trajectory prediction on the object according to the spatial pointwise feature and the temporal pointwise feature of the trajectory points.

For specific limit of the apparatus for forecasting a motion trajectory, reference can be made to the above limit of the method for forecasting a motion trajectory, and details are not repeated herein again. Each device in the above-mentioned apparatus for forecasting a motion trajectory may be implemented in whole or in part by software, hardware, or a combination thereof. The above devices may be embedded in the hardware or independent of the processor in a computer device, or may be stored in a memory in the computer device in the form of software, and the processor can call and execute the operations corresponding to the above devices.

In an embodiment, the spatial feature learning device 720 is configured to obtain a first spatial pointwise feature of each trajectory point by performing feature extraction on each trajectory point; transform the first spatial pointwise feature of each trajectory point into a second spatial pointwise feature by point-voxel propagation; obtain a spatial pointwise feature of the trajectory point by fusing the first spatial pointwise feature with the second spatial pointwise feature.

In an embodiment, the spatial feature learning device 720 is configured to obtain a spatial voxelwise feature of a voxel by propagating the first spatial pointwise feature of the trajectory points to a corresponding voxel; obtain the second spatial pointwise feature of the trajectory points by propagating the spatial voxelwise feature of the voxel to a corresponding trajectory points.

In an embodiment, the temporal feature learning device 730 is configured to determine the observation time intervals according to a preset time interval; determine an output feature of each trajectory point according to the spatial pointwise feature of each trajectory point and obtain the temporal pointwise features of each trajectory point according to the output feature of the trajectory points corresponding to each observation time interval.

In an embodiment, the temporal feature learning device 730 is configured to determine a present observation time interval from the observation time intervals; determine a first temporal pointwise feature of an interval trajectory point according to the output features for each trajectory point; and the interval trajectory point is the trajectory point whose observation time within the present observation time interval; obtain the temporal pointwise feature of each trajectory point according to the first temporal pointwise feature of the interval trajectory point; assign the temporal pointwise feature of each trajectory point to the output feature, and return to the step of determining present observation time interval from the observation time intervals to determine the next observation time interval and iteratively update the temporal pointwise feature of each trajectory point until the present observation time interval reaches a preset maximum observation time interval.

In an embodiment, the temporal feature learning device 730 is configured to perform a full connection on the output features for each trajectory point to obtain a second temporal pointwise feature of each trajectory point; transform the second temporal pointwise feature of each interval trajectory point to the first temporal pointwise feature through the point-voxel propagation.

In an embodiment, the temporal feature learning device 730 is configured to determine a second target voxel to which the interval trajectory points belong; determine a target interval trajectory point belonging to the second target voxel and perform a pooling operation on the second temporal pointwise feature of each target interval trajectory point to obtain a temporal voxelwise feature of the second target voxel; assign the temporal voxelwise feature of the second target voxel to the target interval trajectory points to obtain the first temporal pointwise feature of the target interval trajectory points.

In an embodiment, the temporal feature learning device 730 is configured to fuse the second temporal pointwise feature of each trajectory points with the first temporal pointwise feature of each interval trajectory point to obtain the temporal pointwise feature of each trajectory point.

In an embodiment, the temporal feature learning device 730 is configured to perform a pooling operation on the output feature to obtain pooled output feature before determining the first temporal pointwise feature of the interval trajectory point according to the output features for each trajectory point when the observation time of the object beyond the maximum observation time interval; perform a full connection on the pooled output features for each trajectory point to obtain a third temporal pointwise feature of each trajectory point; perform a pooling operation on the third temporal pointwise feature of the interval trajectory point to obtain the first temporal pointwise feature of the interval trajectory points.

In an embodiment, a start time of the next observation time interval and the present observation time interval are the same, and the difference of an end time between the next observation time interval and the present observation time interval is the preset time interval In an embodiment, the spatial feature learning device 720 is configured to determine a first target voxel to which the trajectory points belong; determine a target trajectory point belonging to the first target voxel and perform a pooling operation on the first spatial pointwise feature of each target trajectory point to obtain the spatial voxelwise feature of the first target voxel.

In an embodiment, the spatial feature learning device 720 is configured to assign the spatial voxelwise feature of the first target voxel to the trajectory points by interpolation to obtain the second spatial pointwise feature.

In an embodiment, the spatial feature learning device 720 is configured to concatenate the first spatial pointwise feature and the second spatial pointwise feature of the trajectory points to obtain the spatial pointwise feature.

In an embodiment, a computer-readable storage medium is provided, which stores a computer program. The computer program is executed by a processor to implement the following steps: obtaining an observed past trajectory of an object; obtaining a spatial pointwise feature of each trajectory point in the observed past trajectory; obtaining a temporal pointwise feature of the trajectory point according to the spatial pointwise feature of the trajectory points within a preset observation time interval; and performing motion trajectory prediction on the object according to the spatial pointwise feature and the temporal pointwise feature of the trajectory points.

In an embodiment, a computer device is provided, including a processor and a memory storing a computer program; when the processor executes the computer program, the following steps are implemented: obtaining an observed past trajectory of an object; obtaining a spatial pointwise feature of each trajectory point in the observed past trajectory; obtaining a temporal pointwise feature of the trajectory point according to the spatial pointwise feature of the trajectory points within a preset observation time interval; and performing motion trajectory prediction on the object according to the spatial pointwise feature and the temporal pointwise feature of the trajectory points.

In some embodiments, all or part of the processes in the method of the above embodiments may be completed by instructing relevant hardware through a computer program, and the computer program may be stored in a non-transitory computer-readable storage medium, when the computer program is executed, the process of the foregoing method embodiments may be included. Any reference to the memory, storage, database or other media used in the embodiments provided in this disclosure may include non-transitory and/or transitory memory. Non-transitory memory may include read-only memory (ROM), programmable ROM (PROM), electrically programmable ROM (EPROM), electrically erasable programmable ROM (EEPROM), or flash memory. Volatile memory can include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synch link) DRAM (SLDRAM), memory bus (Rambus) direct RAM (RDRAM), direct memory bus dynamic RAM (DRDRAM), and memory bus dynamic RAM (RDRAM), etc.

The above embodiments can be arbitrarily combined. To simplify the description, all possible combinations of the features in the above embodiments are not described. However, as long as there is no contradiction in the combination of these features, all should be considered to be in the scope of this disclosure.

The invention claimed is:

1. A method for forecasting a motion trajectory, comprising:
    obtaining an observed past trajectory of an object;
    obtaining a spatial pointwise feature of each trajectory point in the observed past trajectory;
    obtaining a temporal pointwise feature of the trajectory point according to the spatial pointwise feature of the trajectory points within a preset observation time interval; and
    performing motion trajectory prediction on the object according to the spatial pointwise feature and the temporal pointwise feature of the trajectory points;
    wherein obtaining the spatial pointwise feature of each trajectory point in the observed past trajectory comprises:
    obtaining a first spatial pointwise feature of each trajectory point by performing feature extraction on each trajectory point;
    transforming the first spatial pointwise feature of each trajectory point into a second spatial pointwise feature by point-voxel propagation; and
    obtaining a spatial pointwise feature of the trajectory point by fusing the first spatial pointwise feature with the second spatial pointwise feature.

2. The method according to claim 1, the step of transforming the first spatial pointwise feature of each trajectory point into the second spatial pointwise feature by point-voxel propagation comprises:
    obtaining a spatial voxelwise feature of a voxel by propagating the first spatial pointwise feature of the trajectory points to a corresponding voxel;
    obtaining the second spatial pointwise feature of the trajectory points by propagating the spatial voxelwise feature of the voxel to a corresponding trajectory points.

3. The method according to claim 2, the step of obtaining the spatial voxelwise feature of the voxel by propagating the first spatial pointwise feature of the trajectory points to the corresponding voxel comprises:
    determining a first target voxel to which the trajectory points belong;
    determining a target trajectory point belonging to the first target voxel and performing a pooling operation on the first spatial pointwise feature of each target trajectory point to obtain the spatial voxelwise feature of the first target voxel.

4. The method according to claim 3, the step of obtaining the second spatial pointwise feature of the trajectory points by propagating the spatial voxelwise feature of the voxel to a corresponding trajectory points comprises:
    assigning the spatial voxelwise feature of the first target voxel to the trajectory points by interpolation to obtain the second spatial pointwise feature.

5. The method according to claim 1, the step of obtaining the temporal pointwise feature of the trajectory point according to the spatial pointwise feature of the trajectory points within the preset observation time interval comprises:
    determining a plurality of the observation time intervals according to a preset time interval;
    determining an output feature of each trajectory point according to the spatial pointwise feature of each trajectory point, and obtaining the temporal pointwise features of each trajectory point according to the output feature of the trajectory points corresponding to each observation time interval.

6. The method according to claim 5, the step of obtaining the temporal pointwise features of each trajectory point according to the output feature of the trajectory points corresponding to each observation time interval comprises:
    determining a present observation time interval from the plurality of the observation time intervals;
    determining a first temporal pointwise feature of an interval trajectory point according to the output features for each trajectory point; wherein the interval trajectory point is the trajectory point whose observation time within the present observation time interval;
    obtaining the temporal pointwise feature of each trajectory point according to the first temporal pointwise feature of the interval trajectory point; and
    assigning the temporal pointwise feature of each trajectory point to the output feature, and returning to the step of determining present observation time interval from the plurality of the observation time intervals to determine the next observation time interval and iteratively update the temporal pointwise feature of each trajectory point until the present observation time interval reaches a preset maximum observation time interval.

7. The method according to claim 6, the step of determining the first temporal pointwise feature of the interval trajectory point according to the output features for each trajectory point comprises:
    performing a full connection on the output features for each trajectory point to obtain a second temporal pointwise feature of each trajectory point;
    transforming the second temporal pointwise feature of each interval trajectory point to the first temporal pointwise feature through the point-voxel propagation.

8. The method according to claim 7, the step of transforming the second temporal pointwise feature of each interval trajectory point to the first temporal pointwise feature through the point-voxel propagation comprises:
    determining a second target voxel to which the interval trajectory points belong;

determining a target interval trajectory point belonging to the second target voxel and performing a pooling operation on the second temporal pointwise feature of each target interval trajectory point to obtain a temporal voxelwise feature of the second target voxel; and assigning the temporal voxelwise feature of the second target voxel to the target interval trajectory points to obtain the first temporal pointwise feature of the target interval trajectory points.

9. The method according to claim 7, the step of obtaining the temporal pointwise feature of each trajectory point according to the first temporal pointwise feature of the interval trajectory point comprises:

fusing the second temporal pointwise feature of each trajectory points with the first temporal pointwise feature of each interval trajectory point to obtain the temporal pointwise feature of each trajectory point.

10. The method according to claim 6, further comprising:

performing a pooling operation on the output feature to obtain pooled output feature before determining the first temporal pointwise feature of the interval trajectory point according to the output features for each trajectory point when the observation time of the object beyond the maximum observation time interval;

wherein the step of determining the first temporal pointwise feature of the interval trajectory point according to the output features for each trajectory point further comprises:

performing a full connection on the pooled output features for each trajectory point to obtain a third temporal pointwise feature of each trajectory point; and performing a pooling operation on the third temporal pointwise feature of the interval trajectory point to obtain the first temporal pointwise feature of the interval trajectory points.

11. The method according to claim 6, wherein a start time of the next observation time interval and the present observation time interval are the same, and the difference of an end time between the next observation time interval and the present observation time interval is the preset time interval.

12. The method according to claim 1, the step of obtaining the spatial pointwise features of the trajectory point by fusing the first spatial pointwise feature and the second spatial pointwise feature comprises:

concatenating the first spatial pointwise feature and the second spatial pointwise feature of the trajectory points to obtain the spatial pointwise feature.

13. A non-transitory computer-readable storage medium on which a computer program is stored, the computer program is executed by a processor to implement the steps of the method of claim 1.

14. A computer device, comprising a processor and a memory storing a computer program, wherein the processor, when executing the computer program, implements the steps of the method of claim 1.

\* \* \* \* \*